US012648559B2

(12) United States Patent
Murray et al.

(10) Patent No.: US 12,648,559 B2
(45) Date of Patent: Jun. 9, 2026

(54) TOPICAL MOSQUITO CONTROL PRODUCT WITH SUNSCREEN

(71) Applicant: Pouch Pac Innovations, LLC, Sarasota, FL (US)

(72) Inventors: R. Charles Murray, Sarasota, FL (US); John Harlin, Sarasota, FL (US)

(73) Assignee: Pouch Pac Innovations, LLC, Sarasota, FL (US)

( * ) Notice: Subject to any disclaimer, the term of this patent is extended or adjusted under 35 U.S.C. 154(b) by 311 days.

(21) Appl. No.: 18/230,267

(22) Filed: Aug. 4, 2023

(65) Prior Publication Data

US 2023/0380421 A1      Nov. 30, 2023

Related U.S. Application Data

(63) Continuation-in-part of application No. 16/554,843, filed on Aug. 29, 2019, now abandoned, which is a continuation-in-part of application No. 15/656,676, filed on Jul. 21, 2017, now abandoned, which is a continuation-in-part of application No. 15/412,568, filed on Jan. 23, 2017, now abandoned.

(60) Provisional application No. 62/416,399, filed on Nov. 2, 2016, provisional application No. 62/281,369, filed on Jan. 21, 2016.

(51) Int. Cl.
| | |
|---|---|
| *A01N 65/34* | (2009.01) |
| *A01N 31/02* | (2006.01) |
| *A01N 61/02* | (2006.01) |
| *A01N 65/22* | (2009.01) |
| *A01N 65/28* | (2009.01) |

(52) U.S. Cl.
CPC ............. *A01N 31/02* (2013.01); *A01N 65/22* (2013.01); *A01N 65/28* (2013.01)

(58) Field of Classification Search
CPC ........ A01N 65/44; A01N 65/22; A01N 65/28; A01N 65/34; A01N 61/02
See application file for complete search history.

(56) References Cited

U.S. PATENT DOCUMENTS

| | | | | |
|---|---|---|---|---|
| 5,916,541 | A | 6/1999 | Stewart | |
| 5,965,137 | A | 10/1999 | Petrus | |
| 8,753,695 | B1 | 6/2014 | Porter | |
| 9,326,524 | B1 | 5/2016 | Jack | |
| 11,219,222 | B2 * | 1/2022 | Murray | .................. A01N 65/34 |
| 2003/0026823 | A1 | 2/2003 | Fried | |
| 2005/0276761 | A1 * | 12/2005 | Gupta | .................... A61Q 17/04 |
| | | | | 424/59 |
| 2007/0140998 | A1 | 6/2007 | Kato | |
| 2007/0219515 | A1 | 9/2007 | Marsh | |
| 2008/0085961 | A1 | 4/2008 | Lin | |
| 2009/0030069 | A1 | 1/2009 | Perry | |
| 2009/0099135 | A1 | 4/2009 | Enan | |
| 2009/0169656 | A1 | 7/2009 | Porter | |
| 2011/0135764 | A1 | 6/2011 | Enan | |
| 2014/0220164 | A1 | 8/2014 | Manhas | |

FOREIGN PATENT DOCUMENTS

| | | | | |
|---|---|---|---|---|
| WO | WO-9915144 A1 * | 4/1999 | ........... | A61K 8/8147 |

OTHER PUBLICATIONS

Search Report for International Application No. PCT/US2017/014593, dated Apr. 7, 2017, 4 pp.

Maia et al., Plant-based insect repellents; a review of their efficacy, development and testing, Malaria Journal, vol. 10 Suppl 1 ): S 11, 2011, entire document.

* cited by examiner

*Primary Examiner* — Bethany P Barham
*Assistant Examiner* — Danielle Johnson
(74) *Attorney, Agent, or Firm* — Fishman Stewart PLLC

(57) ABSTRACT

A topical mosquito repellent and sunscreen product includes active and inert ingredients. The active ingredients include geraniol, clove oil, and rosemary oil. The inert ingredients include water, mineral oil, zinc oxide, beeswax, monolaurin, triethyl citrate, zeolite, lecithin, and xanthan gum. The mosquito repellent and sunscreen composition is provided as a lotion.

17 Claims, 9 Drawing Sheets

EVALUATION OF SUN PROTECTION
BY SPF DETERMINATION (FDA) - WATER RESISTANT - 40 MINUTE WATER IMMERSION

Table

Sponsor: Penta5 USA LLC. MosquitoPaQ
AMA Lab No.: P-0602
Client No.: MosquitoPaQ™ no-bite no-burn ANYTIME™ Lotion, Sunscreen – Repellent
Batch#: MPSBLLAB120716

| Subject ID # | Sex | MED/ Hr | I (Amps) | Skin Type | MED I $J/M^2$ | MED II $J/M^2$ | STD (7%PadQ/ 3%Oxyb) | WR Control | SPF Values Static | WR |
|---|---|---|---|---|---|---|---|---|---|---|
| 50 3379 | F | 127.7 | 6.0 | II | 44.44 | 44.44 | 16.30 | 15.00 | 30.00 | 30.00 |
| 70 3771 | M | 127.8 | 6.3 | II | 44.44 | 44.44 | 16.30 | 18.00 | 34.50 | 34.50 |
| 54 4408 | F | 126.4 | 6.1 | II | 35.55 | 35.55 | 18.75 | 18.00 | 30.00 | 30.00 |
| 64 3009 | F | 126.5 | 6.3 | III | 55.55 | 55.55 | 16.30 | 15.00 | 34.50 | 34.50 |
| 58 3948 | M | 126.5 | 6.0 | II | 44.44 | 44.44 | 18.75 | 15.00 | 34.50 | 34.50 |
| 70 5746 | M | 126.8 | 6.3 | II | 28.44 | 28.44 | 16.30 | 15.00 | 34.50 | 34.50 |
| 63 4385 | F | 126.1 | 6.0 | II | 44.44 | 44.44 | 16.30 | 18.00 | 30.00 | 30.00 |
| 36 8618 | F | 126.8 | 6.1 | III | 55.55 | 55.55 | 16.30 | 15.00 | 34.50 | 34.50 |
| 50 0924 | F | 125.8 | 6.0 | II | 35.55 | 35.55 | 18.75 | 18.00 | 34.50 | 30.00 |
| 54 2951 | F | 126.8 | 6.1 | III | 44.44 | 44.44 | 16.30 | 15.00 | 30.00 | 30.00 |
| MEAN (x) | | | | | | | 17.04 | 16.20 | 32.70 | 32.25 |
| STANDARD DEV (s) | | | | | | | 1.18 | 1.55 | 2.32 | 2.37 |
| STD. ERROR | | | | | | | 0.37 | 0.49 | 0.73 | 0.75 |
| S.E. % OF MEAN | | | | | | | 2.17 | 3.02 | 2.23 | 2.33 |
| N | | | | | | | 10 | 10 | 10 | 10 |
| UPPER 5% t DIST. | | | | | | | 2.2622 | 2.2622 | 1.8331 | 1.8331 |
| A VALUES | | | | | | | 0.8441 | 1.1088 | 1.3449 | 1.3738 |
| LABEL SPF | | | | | | | 16 | 15 | 31 | 30 |

MED: Minimal Erythemal Dose
I: Intensity of light source

Evaluation Period: This study was conducted from December 9, 2016 through December 28, 2016.

Figure 4

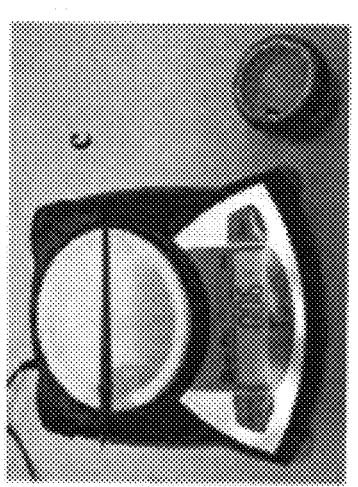
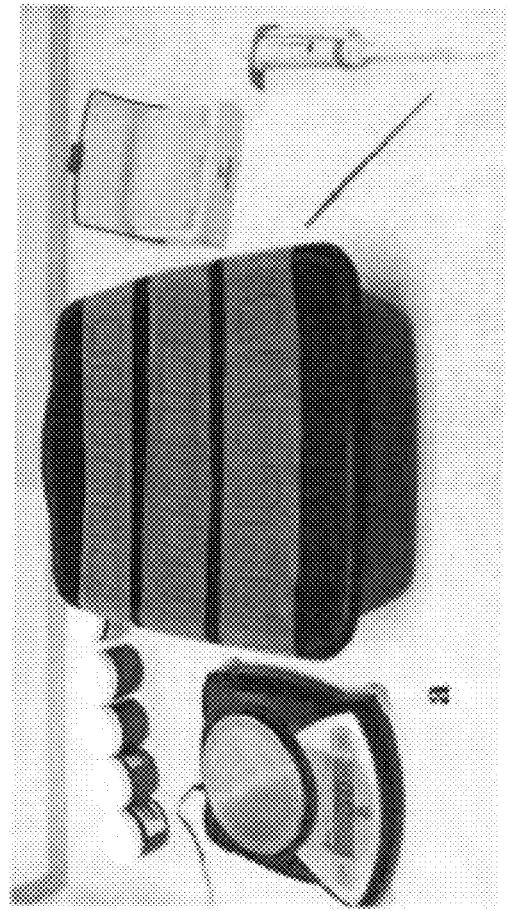
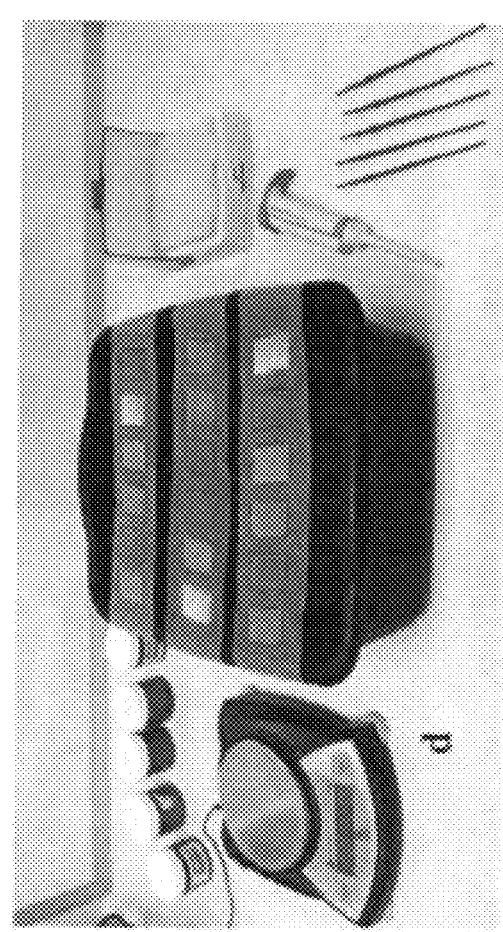
Fig. 6

TOPICAL MOSQUITO CONTROL PRODUCT WITH SUNSCREEN

CROSS-REFERENCE TO RELATED APPLICATIONS

The instant application is a CIP application of U.S. application Ser. No. 16/554,843 filed on Aug. 29, 2019, which is a CIP application of U.S. application Ser. No. 15/656,676 filed on Jul. 21, 2017 which is a CIP application of U.S. application Ser. No. 15/412,568 filed on Jan. 23, 2017 which claims priority to U.S. Provisional Application Ser. No. 62/281,369 filed Jan. 21, 2016 and U.S. Provisional Application Ser. No. 62/416,399 filed Nov. 2, 2016, the entire contents of each of which are incorporated herein by reference.

FIELD OF THE INVENTION

The instant application is directed to a formulation for a topical mosquito repellent with sunscreen.

BACKGROUND OF THE INVENTION

Mosquito bites often cause annoying reactions in humans and animals. Additionally, mosquito bites are a vector for many types of disease including: malaria, Dengue Fever, Chikungunya, West Nile and Zika viruses as well as other forms of disease.

There is a need to prevent mosquitos from biting a host to lessen the discomfort of a bite reaction and to prevent the potential spread of a disease.

Accordingly, a natural non-toxic ingredient based topical product that prevents bites to humans and animals and includes sunscreen protection would be desirable.

SUMMARY OF THE INVENTION

In one aspect, there is disclosed a topical mosquito repellent and sunscreen composition including a lotion having active and inert ingredients. The active ingredients include soybean oil, clove oil, thyme oil and geraniol and the inert ingredients include bee's wax (or beeswax), sunflower oil, 50/50MCT-coconut oil, steric acid/cetyl esters, isopropyl alcohol, zinc oxide, water, vanillin, lecithin, and triethyl citrate.

According to another aspect, there is provided a topical mosquito repellent and sunscreen composition including a lotion having active and inert ingredients. The active ingredients include one or more of geraniol, clove oil, and rosemary oil. The inert ingredients include water, mineral oil, zinc oxide, and beeswax. The inert ingredients may further include monolaurin and/or zeolite, Additionally or alternatively, the inert ingredients include triethyl citrate, lecithin, and/or xanthan gum.

Also disclosed is a method of repelling insects which includes applying the lotion compositions to a body and exposing insects to the lotion. Additionally, the lotion composition includes an SPF factor of greater than 30.

The lotion composition may be packaged in a tube or bottle, among other containers.

Additional features and advantages of mosquito control products described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein and together with the description serve to explain the principles and operations of the claimed subject matter.

BRIEF DESCRIPTION OF THE DRAWINGS

FIG. 4 is a report for SPF testing;

FIG. 6 is a graphical depiction of an experimental apparatus and application of repellents;

DETAILED DESCRIPTION OF THE EMBODIMENTS

Figure 1:
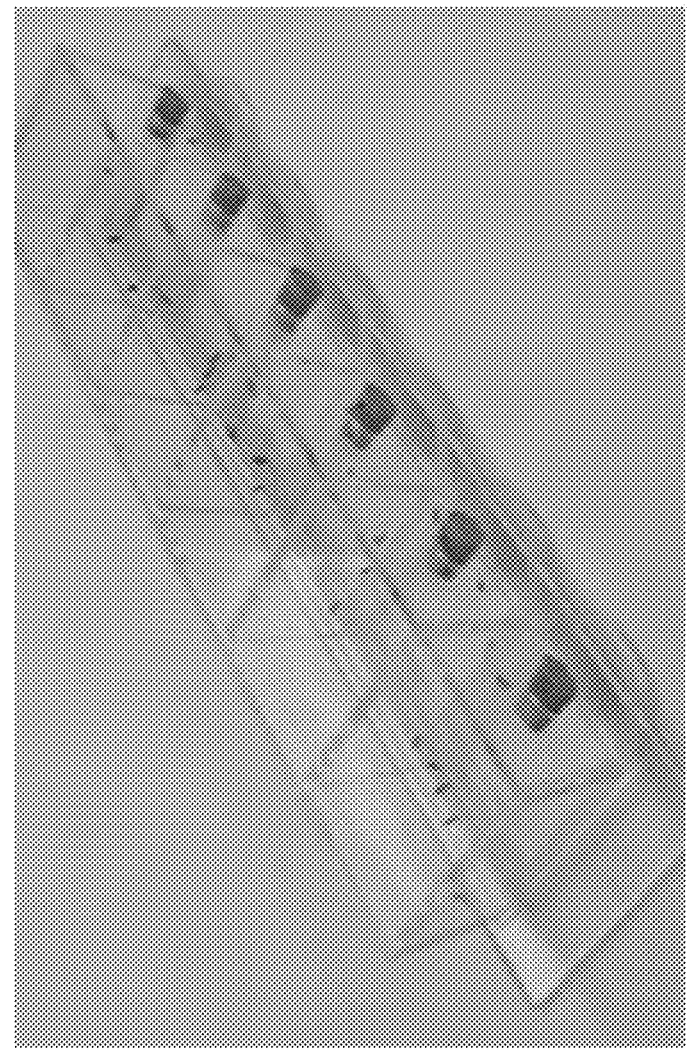
FIG. 1 is a graphical representation of an experimental apparatus used for testing.

Mosquito bites may transmit diseases and cause reactions to people that are bitten. Various repellant compositions have been utilized in prior art repellant compositions. One such repellant, DEET, is often used in mosquito repellant compositions. DEET has been questioned as to its toxicity in higher amounts for use with humans and other subjects. There is therefore a need in the art for an improved and safe topical mosquito repellant composition.

In one aspect, there is disclosed herein a formulation that may be utilized as a topical lotion or spray to repel mosquitos and provide sunscreen protection. The formulation may include organic and chemical-free compositions that will protect humans and other animals from blood-seeking insects such as mosquitos as well as provide sunscreen protection.

In one aspect the composition may include bee's wax, soybean oil, edible oil such as avocado oil or sunflower oil, isopropyl alcohol, peppermint oil, citronella oil, thyme oil, vanillin, water, zinc oxide, lecithin and turmeric oil. Various amounts of these materials may be present in the composition as will be described in more detail below.

As described above, pursuant to an example, the composition may include active ingredients and inactive ingredients. The soybean oil, citronella oil, peppermint oil and thyme oil may be classified as active ingredients wherein the bee's wax, edible oil such as avocado oil or sunflower oil, isopropyl alcohol, vanillin, water, zinc oxide, lecithin and turmeric oil may be considered inert or inactive ingredients.

In another aspect, the composition comprises active ingredients including geraniol, clove oil, and rosemary oil, and inert ingredients including water, mineral oil, zinc oxide, beeswax, monolaurin, triethyl citrate, zeolite, lecithin, and xanthan gum. The inert ingredients may make up by weight of the composition.

Pursuant to an implementation, the geraniol is present in an amount of from 4% to 5% by weight, the clove oil is present in an amount of from 1.5% to 2.5% by weight, the rosemary oil is present in an amount of 0.5% to 1.5% by weight, the water is present in an amount of from 25% to 30% by weight, the mineral oil is present in an amount of from 30% to 40% by weight, the zinc oxide is present in an amount of from 12% to 16% by weight, the beeswax is present in an amount of from 5% to 7% by weight, the monolaurin is present in an amount of from 2% to 4% by weight, the triethyl citrate is present in an amount of from 1.5% to 2.5% by weight, the zeolite is present in an amount of from 1% to 2% by weight, the lecithin is present in an amount of from 0.5% to 1% by weight, and the xanthan gum is present in an amount of from 0.01% to 0.03% by weight.

Example 1

In one aspect, the lotion formulation may include a sunscreen component with a SPF value of 30. The formulation may include:

| Ingredient | grams | x density | ml (+/−1%) | Weight Percentage |
|---|---|---|---|---|
| Avocado Oil | 390 | 0.915 | 356.85 | 39% |
| Soy Bean Oil | 330 | 0.917 | 302.61 | 33% |
| Beeswax | 200 | 0.96 | 192 | 20% |
| Isopropyl | 65 | 0.7854 | 51 | 6.50% |
| Citronella Oil | 3 | 0.855 | 2.57 | 0.30% |
| Peppermint Oil | 4 | 0.905 | 3.62 | 0.40% |
| Thyme Oil | 1.5 | 0.941 | 1.41 | 0.15% |
| Vanillin (powder) | 1.5 | 1.056 | 1.58 | 0.15% |
| Water | 5 | 1 | 5 | 0.50% |
| Total | 1000 | | 916.64 | 100% |

As specified above, the composition may include bee's wax, soybean oil, edible oil such as avocado oil, isopropyl alcohol, peppermint oil, citronella oil, and thyme oil. The bee's wax may be present in an amount of from 15 to 25% by weight. The soybean oil may be present in an amount of from 25 to 40% by weight. The avocado oil may be present in an amount of from 35 to 50% by weight. The isopropyl alcohol may be present from 5 to 15% by weight. The peppermint oil may be present at about 1% by weight. The citronella oil may also be present in an amount of from 0.3 to 0.5% by weight. The thyme oil may be present at about 0.1 to 0.20% by weight. Additionally, the composition may include powdered ingredients such as vanillin present at about 0.1 to 0.20% by weight. The weight percentages are based on a total weight of the composition.

The formulation includes approximately 80% oils and liquid to beeswax, however this ratio can be altered by increasing/or decreasing beeswax by 3 to 5% for a desired consistency for varied temperature environments. The density of product as formulated above is 0.917 g/ml. The active ingredients in the above formulation may include: soybean oil, citronella oil, peppermint oil, and thyme oil. The avocado oil, bee's wax, isopropyl alcohol, vanillin and water may be inert ingredients.

The composition of example 1 may be formed by heating the soy oil, avocado oil to approximately 140° F. Next, the beeswax is added to the composition. Next, the citronella oil, peppermint oil, thyme oil are added to the composition and mixed thoroughly. The composition is then allowed to cool to room temperature forming a stiff mass. Next, the composition is blended with a lotion substrate to form a cream lotion or spray. Various ratios of the composition and substrate may be utilized, for example a ratio of 50 to 4, 48 to 6, and 50 to 8 may be utilized with respect to the composition and the substrate cream component.

Example 2

In another aspect, the lotion and sunscreen formulation may include:

| Ingredient | Density | Weight percentage |
|---|---|---|
| Avocado Oil | .915 | 44% |
| Soy Bean Oil | .917 | 26% |
| Beeswax | .960 | 16% |
| Zinc Oxide | 5.61 | 6% |
| Isopropyl | .7854 | 5% |
| Citronella Oil | .855 | 1% |
| Pepper Mint Oil | .905 | 1% |
| Thyme Oil | .941 | 0.5% |
| Vanillin (powder) | 1.056 | 0.4% |
| Lecithin ( powder) | 1.030 | 0.1% |

As specified above, the composition may include bee's wax, soybean oil, edible oil such as avocado oil, isopropyl alcohol, peppermint oil, citronella oil, and thyme oil. The bee's wax may be present in an amount of from 10 to 20% by weight. The soybean oil may be present in an amount of from 20 to 30% by weight. The avocado oil may be present in an amount of from 35 to 50% by weight. The isopropyl alcohol may be present from 5 to 15% by weight. The peppermint oil may be present at about 1% by weight. The citronella oil may also be present in an amount of from 1% to 2% by weight. The thyme oil may be present at about 0.5% by weight. Additionally, the composition may include powdered ingredients such as vanillin present at about 0.4% by weight and Lecithin present at about 0.1% by weight and zinc oxide at about 6% by weight. The weight percentages are based on a total weight of the composition.

The active ingredients in the above formulation may include: soybean oil, citronella oil, peppermint oil, and thyme oil. The bee's wax, avocado oil, isopropyl alcohol, vanillin, water, zinc oxide and lecithin may be inert ingredients.

The composition of example 2 was made according to the following procedure. The soybean oil and avocado oils were heated from room temperature to 145 to 160 degrees)(° F. in a mixing vat under agitation. The vanillin, lecithin and bee's wax were added to the composition when the temperature approaches 100° F. The mixture is heated and agitated until the mixture clears. Once the mixture clears heat is removed from the composition. At Temperature of 145° F. the zinc oxide is added and shearing of the mixture begins. Water is then added to the composition under agitation and the composition is cooled to 110° F. Isopropyl alcohol is added at the temperature of 110° F. The mixture immediately cools to 100° F. At this time the peppermint oil, citronella oil and thyme oil are added to the composition. The composition is agitated and sheared for 30 minutes. After which time the lotion may be packaged.

5

Example 3

In a further aspect, the lotion and sunscreen formulation may include:

| | PER-CENTAGE | DENSITY | DENSITY X % | PERCENT RANGE |
|---|---|---|---|---|
| ACTIVE INGREDIENTS | | | | |
| Soybean Oil | 31.5 | 0.915 | 29.344 | PLUS-MINUS 15% |
| Citronella Oil | 2.4 | 0.855 | 2.052 | PLUS-MINUS 30% |
| Peppermint Oil | 1 | 0.905 | 0.905 | PLUS-MINUS 30% |
| INERT INGREDIENTS | | | | |
| Sunflower Oil | 36 | 0.924 | 33.264 | PLUS-MINUS 40% |
| Beeswax | 10 | 0.96 | 9.6 | PLUS-MINUS 30% |
| Zinc Oxide (6%) | 6 | 5.61 | 33.66 | PLUS-MINUS 45% |
| Isopropyl Alcohol | 4.4 | 0.7854 | 3.45576 | PLUS-MINUS 20% |
| Water | 5 | 1 | 5 | PLUS-MINUS 35% |
| Vanillin | 2 | 1.056 | 2.112 | PLUS-MINUS 40% |
| Turmeric Oil | 1.5 | 0.92 | 1.38 | PLUS-MINUS 40% |
| Lecithin | 0.2 | 1.03 | 0.206 | PLUS-MINUS 25% |

As specified above, the composition may include bee's wax, soybean oil, an edible oil such as sunflower oil, isopropyl alcohol, peppermint oil, citronella oil, zinc oxide, water and turmeric oil. The bee's wax may be present in an amount of from 5 to 20% by weight. The soybean oil may be present in an amount of from 15 to 40% by weight. The sunflower oil may be present in an amount of from 30 to 50% by weight. The isopropyl alcohol may be present from 3 to 15% by weight. The peppermint oil may be present at about 1% by weight. The citronella oil may also be present in an amount of from 1% to 5% by weight. The turmeric oil may be present at about 1.5% by weight. Water may be present in an amount of from 2 to 10% by weight. Zinc oxide may be present in an amount of 3 to 10% by weight. Additionally, the composition may include powdered ingredients such as vanillin present at about 2% by weight and Lecithin present at about 0.2% by weight. The weight percentages are based on a total weight of the composition.

The active ingredients in the above formulation may include: soybean oil, citronella oil, and peppermint oil. The bee's wax, sunflower oil, isopropyl alcohol, zinc oxide, water, vanillin, lecithin and turmeric oil may be inert ingredients.

The composition of example 3 was made according to the following procedure. The soybean oil and sunflower oils were heated from room temperature to 145 to 160 degrees F. in a mixing vat under agitation. The vanillin, lecithin and bee's wax were added to the composition when the temperature approaches 100° F. The mixture is heated and agitated until the mixture clears. Once the mixture clears heat is removed from the composition. At Temperature of 145° F. the zinc oxide is added and shearing of the mixture begins. Water is then added to the composition under agitation and the composition is cooled to 110° F. Isopropyl alcohol is added at the temperature of 110° F. The mixture immediately cools to 100° F. At this time the peppermint oil, citronella oil and turmeric oil are added to the composition. The composition is agitated and sheared for 30 minutes. After which time the lotion may be packaged.

Example 4

In a further aspect, the lotion and sunscreen formulation may include:

| | PER-CENTAGE | DENSITY | DENSITY X % | PERCENT RANGE |
|---|---|---|---|---|
| ACTIVE INGREDIENTS | | | | |
| Soybean Oil | 30 | 0.915 | 29.344 | PLUS-MINUS 15% |
| Citronella Oil | 3 | 0.855 | 2.565 | PLUS-MINUS 30% |
| Peppermint Oil | 2 | 0.905 | 0.905 | PLUS-MINUS 30% |
| Cinnamon Oil | 2 | 1.04 | 2.08 | PLUS-MINUS 30% |
| INERT INGREDIENTS | | | | |
| Sunflower Oil | 32.15 | 0.924 | 29.7066 | PLUS-MINUS 40% |
| Beeswax | 10.5 | 0.96 | 10.08 | PLUS-MINUS 30% |
| Triethyl citrate | 5 | 1.136 | 5.68 | PLUS-MINUS 15% |
| Salt | 0.15 | 2.16 | 0.324 | PLUS-MINUS 20% |
| Zinc Oxide (6%) | 6 | 5.61 | 33.66 | PLUS-MINUS 45% |
| Isopropyl Alcohol | 2 | 0.7854 | 1.5708 | PLUS-MINUS 20% |
| Water | 2 | 1 | 2 | PLUS-MINUS 35% |
| Vanillin | 5 | 1.056 | 5.28 | PLUS-MINUS 40% |
| Turmeric Oil | 0 | 0.92 | 0 | PLUS-MINUS 40% |
| Lecithin | 0.2 | 1.03 | 0.206 | PLUS-MINUS 25% |

As specified above, the composition may include bee's wax, soybean oil, an edible oil such as sunflower oil, isopropyl alcohol, peppermint oil, 50/50 MCT-coconut oil, citronella oil, cinnamon (or thyme) oil, zinc oxide, triethyl citrate, salt, water and turmeric oil. The bee's wax may be present in an amount of from 7 to 13% by weight. The soybean oil may be present in an amount of from 12 to 25% by weight. The sunflower oil may be present in an amount of from 13 to 30% by weight. The isopropyl alcohol may be present from 0.5 to 1.5% by weight. The geraniol (e.g., citronella oil) may be present in an amount of from 4% to 5% by weight. The clove oil may be present in an amount of from 1.5% to 2.5% by weight. The thyme oil may be present in an amount of from 0.5% to 1.5% by weight. The 50/50 MCT-coconut may be present in an amount of from 8 to 14% by weight. The triethyl citrate may be present in an amount of from 1.5 to 7% by weight. Water may be present in an amount of from 2 to 10% by weight. Zinc oxide may be present in an amount of 3 to 16% by weight. Additionally, the composition may include powdered ingredients such as vanillin present in an amount of from 2 to 6% by weight and Lecithin present at about 0.2% by weight. The weight percentages are based on a total weight of the composition.

The active ingredients in the above formulation may include: soybean oil, citronella oil, thyme oil and clove oil. The bee's wax, sunflower oil, isopropyl alcohol, zinc oxide, water, salt, triethyl citrate, vanillin, lecithin and turmeric oil may be inert ingredients.

The composition of example 4 was made according to the following procedure. The soybean oil and sunflower oils were heated from room temperature to 145 to 160 degrees F. in a mixing vat under agitation. The vanillin, lecithin and bee's wax were added to the composition when the temperature approaches 100° F. The mixture is heated and agitated until the mixture clears. Once the mixture clears heat is removed from the composition. At Temperature of 145° F. the zinc oxide is added and shearing of the mixture begins. Water is then added to the composition under agitation and the composition is cooled to 110° F. Isopropyl alcohol is added at the temperature of 110° F. The mixture immediately cools to 100° F. At this time the peppermint oil, citronella oil, cinnamon oil, triethyl citrate, salt and turmeric oil are added to the composition. The composition is agitated and sheared for 30 minutes. After which time the lotion may be packaged.

Example 5

In a further aspect, the lotion and sunscreen formulation may include:

| | PER-CENTAGE | DENSITY | Density X % | PERCENT RANGE |
|---|---|---|---|---|
| ACTIVE INGREDIENTS | | | | |
| Soybean Oil | 22.4 | 0.915 | 20.496 | PLUS-MINUS 15% |
| Geraniol | 4.5 | 0.889 | 4.0005 | PLUS-MINUS 30% |
| Clove Oil | 2 | 0.952 | 1.904 | PLUS-MINUS 30% |
| Thyme Oil | 1 | 0.941 | 0.941 | PLUS-MINUS 30% |

-continued

| | PER-CENTAGE | DENSITY | Density X % | PERCENT RANGE |
|---|---|---|---|---|
| INERT INGREDIENTS | | | | |
| Sunflower Oil | 21 | 0.924 | 19.404 | PLUS-MINUS 40% |
| Coconut oil | 16 | 0.95 | 15.2 | PLUS-MINUS 50% |
| Beeswax | 10 | 0.96 | 9.6 | PLUS-MINUS 30% |
| Zinc Oxide | 12 | 5.61 | 39.27 | PLUS-MINUS 45% |
| Water | 4.65 | 1 | 4.65 | PLUS-MINUS 35% |
| Steric Acid/ Cetyl Esters | 3 | 0.941 | 2.823 | PLUS-MINUS 50% |
| Vanillin | 4.5 | 1.056 | 4.752 | PLUS-MINUS 40% |
| Triethyl Citrate | 2.75 | 1.137 | 3.12675 | PLUS-MINUS 15% |
| Isopropyl Alcohol | 1 | 0.7854 | 0.7854 | PLUS-MINUS 20% |
| Lecithin | 0.2 | 1.03 | 0.206 | PLUS-MINUS 25% |

As specified above, the composition may include bee's wax, soybean oil, an edible oil such as sunflower oil and/or Coconut oil, isopropyl alcohol, clove oil, thyme oil, geraniol, zinc oxide, triethyl citrate, water, and Steric Acid/Cetyl Esters.

The bee's wax may be present in an amount of from 7 to 13% by weight. The soybean oil may be present in an amount of from 12 to 25% by weight. The sunflower oil may be present in an amount of from 13 to 30% by weight. The isopropyl alcohol may be present from 0.5 to 1.5% by weight. The geraniol may be present in an amount of from 4% to 5% by weight. The clove oil may be present in an amount of from 1.5% to 2.5% by weight. The thyme oil may be present in an amount of from 0.5% to 1.5% by weight. The Coconut oil may be present in an amount of from 8 to 16% by weight. The Steric Acid/Cetyl Esters may be present in an amount of from 1.5 to 4.5% by weight. The triethyl citrate may be present in an amount of from 2.3 to 3.1% by weight. Water may be present in an amount of from 3 to 5.2% by weight. Zinc oxide may be present in an amount of 4 to 14% by weight. Additionally, the composition may include powdered ingredients such as vanillin present in an amount of from 2 to 6% by weight and Lecithin present at about 0.2% by weight. The weight percentages are based on a total weight of the composition.

The active ingredients in the above formulation may include: soybean oil, clove oil, thyme oil and geraniol. The bee's wax, sunflower oil, 50/50 medium-chain triglyceride (MCT)-coconut oil, isopropyl alcohol, zinc oxide, water, Steric Acid/Cetyl Esters, triethyl citrate, vanillin, and lecithin may be inert ingredients.

The composition of example 5 was made according to the following procedure. The soybean oil and sunflower oils were heated from room temperature to 145 to 160 degrees F.

in a mixing vat under agitation. The lecithin and water were added to the composition when the temperature approaches 100° F. The mixture is heated and agitated until about 125 degrees F. and a shearing mechanism is activated and maintained until the mixture contains no grit. Next, Steric Acid/Cetyl Esters, triethyl citrate, vanillin and MCT-coconut oil are added to the composition under agitation. Next the bee's wax is added at temperature of 145° F. and again the shearing mechanism is activated and maintained until the mixture contains no grit. As the shearing continues, the zinc oxide is added slowly to the composition.

The composition is maintained under agitation and heat is tuned off from the composition. Isopropyl alcohol, clove oil, thyme oil and geraniol are added and the composition cools to about 125-130° F. The composition is agitated and sheared for a specified time dependent upon the size of the batch. After which time the lotion may be packaged.

Example 6

In a further aspect, the insect repellent and sunscreen formulation may include:

| | PERCENTAGE | DENSITY | Density X % | PERCENT RANGE |
|---|---|---|---|---|
| ACTIVE INGREDIENTS | | | | |
| Geraniol | 4.5 | 0.889 | 4.0005 | PLUS-MINUS 30% |
| Clove Oil | 2 | 1.05 | 2.1 | PLUS-MINUS 30% |
| Rosemary Oil | 1 | 0.925 | 0.925 | PLUS-MINUS 30% |
| INERT INGREDIENTS | | | | |
| Water | 28 | 1 | 28.5 | PLUS-MINUS 35% |
| Mineral oil | 36.8 | 0.8 | 29.44 | PLUS-MINUS 40% |
| Zinc Oxide | 14 | 5.61 | 78.54 | PLUS-MINUS 45% |
| Beeswax | 6 | 0.961 | 5.766 | PLUS-MINUS 30% |
| 1-Monolaurin | 3 | 0.997 | 2.991 | PLUS-MINUS 50% |
| Triethyl Citrate | 2 | 1.14 | 2.28 | PLUS-MINUS 15% |
| Zeolite | 1.5 | 2.3 | 3.45 | PLUS-MINUS 40% |
| Lecithin | 0.7 | 1.03 | 0.721 | PLUS-MINUS 25% |
| Xanthan Gum | 0.02 | 1.5 | 0.03 | PLUS-MINUS 40% |

As specified above, the formulation or composition may include geraniol, clove oil, rosemary oil, water, mineral oil, zinc oxide, beeswax, monolaurin, triethyl citrate, zeolite, lecithin, and xanthan gum. The composition may be provided as a lotion.

The geraniol may be present in an amount of from 4% to 5% by weight. The clove oil may be present in an amount of from 1.5% to 2.5% by weight. The rosemary oil may be present in an amount of 0.5% to 1.5% by weight. The water may be present in an amount of from 20% by weight to 35% by weight, particularly 25% by weight to 30% by weight. The mineral oil may be present in an amount of from 25% to 45% by weight, particularly 30% to 40% by weight, more particularly 35% to 38.5% by weight. The zinc oxide may be present in an amount of from 6% to 20% by weight, particularly 12% to 16% by weight. The beeswax may be present in an amount of from 3% to 10% by weight, particularly from 5% to 7% by weight. The monolaurin may be present in an amount of from 1% to 10% by weight, particularly 1.5% to 4.5% by weight, more particularly from 2% to 4% by weight. The triethyl citrate may be present in an amount of from 1% to 3% by weight, particularly 1.5% to 2.5% by weight. The zeolite may be present in an amount of from to 3% by weight, particularly 1% to 2% by weight, more particularly from 1.25% to 1.75%. The lecithin may be present in an amount of 0.5% to 1% by weight, particularly from 0.6% to by weight. The xanthan gum may be present in an amount of about 0.02% by weight (e.g., to 0.03% by weight).

The composition provides protection from insect bites combined with broad spectrum SPF protection, e.g., SPF of 30 or greater. Moreover, the composition formulation demonstrates improvements with respect to extended shelf life and reduced oil degradation.

Pursuant to an implementation, the zinc oxide is present with a particle size in the nanometer (nm) range, e.g., a particle size under 1000 nm. Additionally or alternatively, the zinc oxide may be present in at least two different size ranges of particles. Stated alternatively, the zinc oxide comprises a mixture of different sized particles. The mixture of differently sized zinc oxide particles may include half or 50% of the zinc oxide particles with a size of 50 nm or less, and half or 50% of the zinc oxide particles range from greater than 50 nm to less than 250 nm. Pursuant to the example 6, the portion of zinc oxide (14% of the composition) includes 7% zinc oxide with a particle size of 20-50 nm, and 7% zinc oxide with a particle size of 80-200 nm. The provision of two different size ranges of zinc oxide extends (SPF) protection over the entire UVA and UVB range to facilitate providing "broadscreen" or broad spectrum protection.

The provision of zeolite (e.g., aluminosilicate) enhances SPF protection in the UVB wavelength range (280-315 nm). Pursuant to an implementation, the zeolite is provided in a size range of 20-60 nm, particularly 30-50 nm, to facilitate UVB protection. Zeolite is generally recognized as safe (GRAS) and is thus both safe and effective.

The provision monolaurin or 1-monolaurin extends shelf life and greatly reduces bacteria on skin which attract insects such as mosquitoes.

The provision of mineral oil (e.g., NSF white light mineral oil) in place of seed and/or vegetable oils (e.g., soybean oil and sunflower oil) facilitates improvements in UV absorption and oil degradation. For example, mineral oil reduces or even eliminates the prospect of oxidation, which shortens shelf life.

The xanthan gum is provided as a thickening and/or stabilizing agent.

The lotion as per Example 6 exhibits a cream/ivory white color and/or a pH of between 6-7, in particular a pH of 6.33.

The active ingredients in the above formulation may include geraniol, clove oil, and rosemary oil. The water, mineral oil, zinc oxide, beeswax, monolaurin, triethyl citrate, zeolite, lecithin, and xanthan gum may be inert ingredients, with the zinc oxide being an active ingredient with respect to SPF or sunscreen protection.

The composition has an SPF of 30 or greater.

The percentages by weight indicated above may also be expressed as percent weight/volume (% w/v) without departing from the scope of the disclosure.

Pursuant to an alternative example, monolaurin may be replaced by coconut oil which may be present in an amount of from 6% to 16% by weight. Additionally or alternatively, the rosemary oil may be replaced with thyme oil The composition of example 6 may be made according to the following procedure. The mineral oil is heated from room temperature to about 145° F. to 160° F. in a mixing vat under agitation. The lecithin and water are then added to the composition when the temperature approaches 100° F. The mixture is heated and agitated until about 125° F. and a shearing mechanism is activated until the mixture contains no grit. Next, triethyl citrate, monolaurin, and xanthan gum are added to the composition under agitation. The beeswax is then added at a temperature of 145° F. and the shearing mechanism is activated and maintained until the mixture contains no grit. As the shearing continues, the zinc oxide and zeolite are added to the composition. The composition is maintained under agitation and the heat is reduced or turned off from composition. Then, the geraniol, clove oil, and rosemary oil are added and the composition cools to about 100° F. to 130° F. The composition is agitated and sheared for a specified time dependent upon the size of the batch. After which time the lotion may be packaged.

Testing

Figure 2:
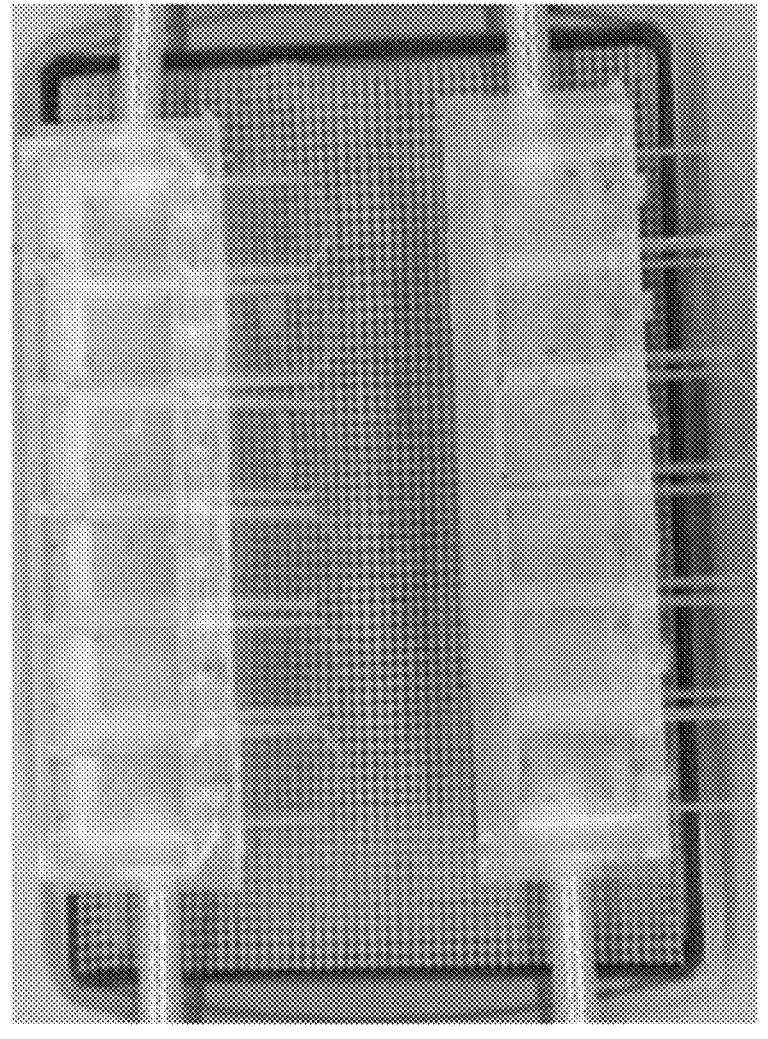
FIG. 2 is a graphical depiction of an experimental apparatus positioned over a blood source.
Figure 3:
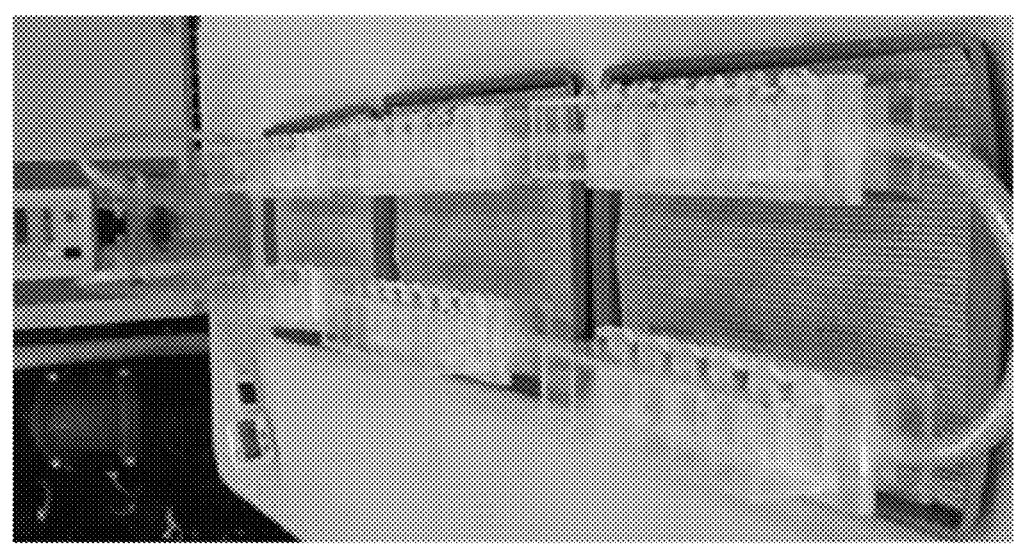
FIG. 3 is a graphical representation of an experimental apparatus including a circulating pump providing warm water to the testing apparatus.

The deterrent effect of the above-described compositions of examples 1 and 2 was tested in a controlled environment. In vitro laboratory tests were conducted and measured and compared to DEET and nontreated control groups for yellow fever mosquitos, *Aedes aegypti*. Bioassays were conducted in nine six-chambered Plexiglas K & D modules stocked with female *Aedes aegypti* mosquitos as shown in FIGS. 1-3. Five female mosquitos were aspirated into each of the six chambers of the nine modules. Repellant treatments were applied at 26.7 microliters with a pipette and spread with a small brush over 12 square centimeter sections of organdy cloth attached to a flat plastic template containing rectangular openings. The treated cloth covered template was fitted between the K & D module and a lower Plexiglas unit. The lower Plexiglas unit contained shallow surface wells filled with a blood substitute (CDTA and ATP) and covered with a moistened collagen membrane. The blood substitute was heated to 38° C. using water pumped through hose lines attached to the lower units and a water bath supplied with a temperature controlled inversion circulator. Mosquitos were exposed to the treated surfaces by opening sliding doors beneath the modules for 90-second biting counts at five post-treatment time intervals from 1 to 6 hours. Fresh, untreated mosquitos are used for each time interval.

The bite counts were tabulated and utilized for statistical analysis. The percent repellency of the formulations as described above was more effective than DEET over the five time periods. At the initial start time of zero the repellency of the composition as described herein was 100% while DEET was 91.9%. The average for all five time periods demonstrates the repellency of 94.54% for the compositions as described herein compared to 86.52% for DEET. At the 6 hour time period the compositions as described herein included a repellency of 96.8% effective compared to DEET which was 87.1% effective.

The testing protocol including the in vitro environment provides a rigorous testing of the repellency of the composition as the mosquitos are confined with a blood meal.

An unpaired t-test was conducted on the biting counts between lotion as described herein and the control group where there was no treatment applied between the mosquito and the blood well. The results of this test showed highly significant results between the mean biting counts of 0.33 for the compositions as described herein compared to 3.44 for the control group. The statistical factors include t=5.8704 where df=16 and a standard error of difference is equal to 0.530. The two-tailed p value is less than 0.0001. The reduction in biting pressure when using the compositions compared to the control group is significant at the 99.99 level of significance.

The experimental results demonstrate a very high effectiveness of repellency utilizing a safe and effective organic product that is both DEET and chemical free. The testing has demonstrated that the product is effective in repelling mosquitos and in particular the yellow fever mosquito which may potentially carry West Nile virus.

Additional testing was performed with the lotion of example 3 including sunflower oil, isopropyl alcohol, peppermint oil, citronella oil, zinc oxide, water and turmeric oil with the following protocols. *Aedes aegypti* mosquitoes were obtained from insecticide-susceptible reference strains held at the London School of Hygiene & Tropical Medicine, UK. All mosquitoes are reared and housed under optimal environmental conditions of 25° C.±2° C. and 80% Relative Humidity with a 12:12 hour photoperiod. Testing was carried out in a testing room maintained at and 80% RH with a 12:12 hour photoperiod. For each product, the same person carried out the arm-in-cage testing.

For each product test, three batches of 50 female mosquitoes were placed in cages inside the testing room. Before the start of each test a bare arm with gloved hand was inserted into the cage for 30 seconds to assess the biting readiness of the mosquitoes. Only cages with at least ten mosquitoes landing within 30 seconds were used in subsequent testing. The number of mosquitoes probing the untreated arm was counted at the end of the 30 second test.

Following the combined fitness/control test, the product was applied onto the right arm at the WHO standard rate of 1 ml per 600 cm 2 (1.6711 per crn2) for DEET, and at a rate of 2 mg per cm' for the Sunscreen Repellent. The arm was then inserted into the cage for 30 seconds and the number of mosquitoes probing on the arm counted and recorded. The procedure was repeated with a total of three cages. This was repeated for each of the three cages and at hourly intervals until 8 hours post-application or until protection drops below 50%. Each product was tested on a separate test day.

Protective efficacy (PE) was calculated using the following formula: PE=(Mosquitoes probing on control arm−Mosquitoes probing on treated arm)/Mosquitoes probing on control arm×100.

The average probing on the control arm during testing was 17 and 21 mosquitoes at the end of the 30 second exposure time, in cages used for testing the Sunscreen Repellent Lotion and 8% DEET respectively. The Sunscreen Repellent Lotion provided 100% protection at 0 hours, whereas the 8% DEET provided 100% protection for 1 hour after application (Table 1). The Sunscreen Repellent Lotion provided 50% protection for 2 hours.

TABLE 1

Total Protective Efficacy of the Sunscreen Repellent
Lotion and 8% DEET against *Aedes aegypti* mosquitos

| Hours after Application | Time (hh:mm) | Replicate | No. probing on bare control arm | No. probing on treated arm | % PE | Total % PE |
|---|---|---|---|---|---|---|
| 0 | 11:24 | 1 | 17 | 0 | 100.00 | 100.00 |
|   | 11:27 | 2 | 22 | 0 | 100.00 |  |
|   | 11:29 | 3 | 14 | 0 | 100.00 |  |
| 1 | 12:26 | 1 | 19 | 1 | 94.74 | 94.12 |
|   | 12:28 | 2 | 20 | 2 | 90.00 |  |
|   | 12:30 | 3 | 12 | 0 | 100.00 |  |
| 2 | 13:25 | 1 | 25 | 1 | 96.00 | 92.98 |
|   | 13:28 | 2 | 22 | 1 | 95.45 |  |
|   | 13:30 | 3 | 10 | 2 | 80.00 |  |
| 3 | 14:30 | 1 | 19 | 14 | 26.32 | 37.50 |
|   | 14:32 | 2 | 11 | 6 | 45.45 |  |
|   | 14:34 | 3 | 10 | 5 | 50.00 |  |

COMPARATIVE TABLE 2

Total Protective Efficacy of 8% DEET against *Aedes aegypti*

| Hours after Application | Time (hh:mm) | Replicate | No. probing on bare control arm | No. probing on treated arm | % PE | Total % PE |
|---|---|---|---|---|---|---|
| 0 | 09:40 | 1 | 16 | 0 | 100.00 | 100.00 |
|   | 09:42 | 2 | 28 | 0 | 100.00 |  |
|   | 09:44 | 3 | 30 | 0 | 100.00 |  |
| 1 | 10:40 | 1 | 15 | 0 | 100.00 | 100.00 |
|   | 10:42 | 2 | 23 | 0 | 100.00 |  |
|   | 10:43 | 3 | 35 | 0 | 100.00 |  |
| 2 | 11:42 | 1 | 12 | 1 | 91.67 | 95.00 |
|   | 11:44 | 2 | 22 | 2 | 90.91 |  |
|   | 11:46 | 3 | 26 | 0 | 100.00 |  |
| 3 | 12:40 | 1 | ND | ND | — | 95.35 |
|   | 12:42 | 2 | 20 | 2 | 90.00 |  |
|   | 12:46 | 3 | 23 | 0 | 100.00 |  |
| 4 | 01:40 | 1 | 24 | 2 | 91.67 | 95.16 |
|   | 01:42 | 2 | 17 | 1 | 94.12 |  |
|   | 01:44 | 3 | 21 | 0 | 100.00 |  |
| 5 | 02:40 | 1 | 29 | 2 | 93.10 | 90.00 |
|   | 02:42 | 2 | 18 | 2 | 88.89 |  |
|   | 02:44 | 3 | 23 | 3 | 86.96 |  |
| 6 | 03:40 | 1 | 17 | 10 | 41.18 | 54.90 |
|   | 03:42 | 2 | 14 | 6 | 57.14 |  |
|   | 03:44 | 3 | 20 | 7 | 65.00 |  |
| 7 | 04:40 | 1 | 11 | 7 | 36.36 | 46.34 |
|   | 04:42 | 2 | 12 | 6 | 50.00 |  |
|   | 04:44 | 3 | 18 | 9 | 50.00 |  |

The sunscreen lotion showed complete protective efficacy (0 hours) and 50% protective efficacy at 2 hours. DEET (8%) provided the longer complete protective efficacy (1 hour) and 50% protective efficacy time (6 hours).

SPF Testing

Referring to FIG. 4 there is shown a detailed report regarding the SPF of the composition of Examples 1-3. The compositions were subjected to a 40 minute water immersion test. The report indicates a SPF of 30+ for the compositions.

Additional Testing

Additional field testing of the sunscreen lotion formulations was performed.

Sarasota, Florida

Several visits to beaches in Sarasota, Florida during the summer months of 2016 with application of the compositions of examples 1-3 applied to the skin of a person. It was observed:

a) No mosquito bites during stays as long as 4 hours—repellency of 100%, b) No reduction in repellency after trips into Gulf waters during the 4 hour+ stays c) Nearby beach goers and swimmers were experiencing bites from mosquitoes.

Figure 5:
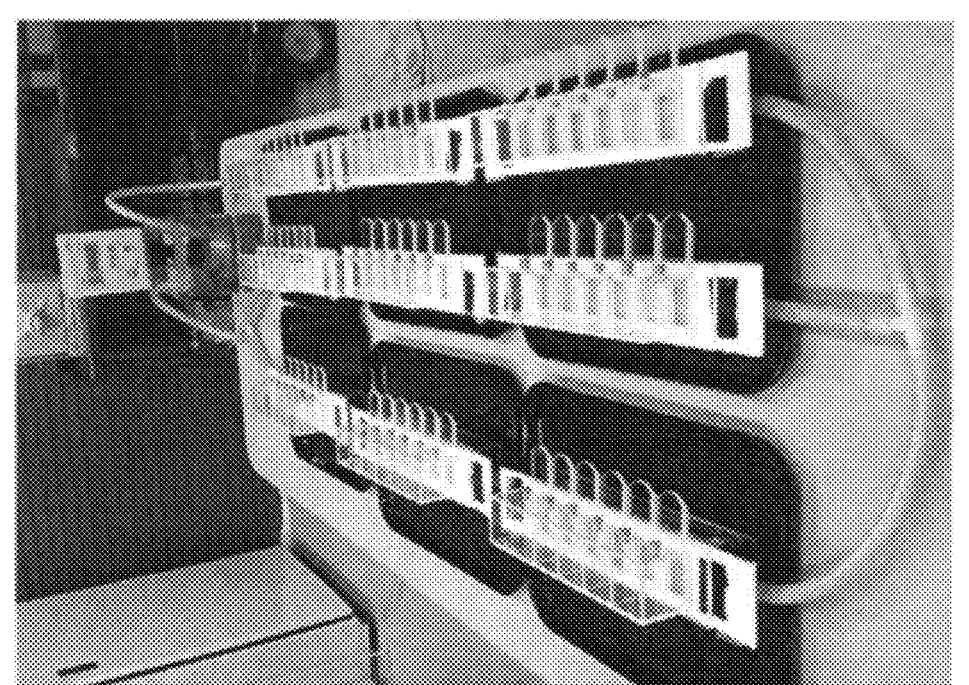
FIG. 5 is a graphical depiction of an experimental apparatus positioned over a blood source.
Figure 7:
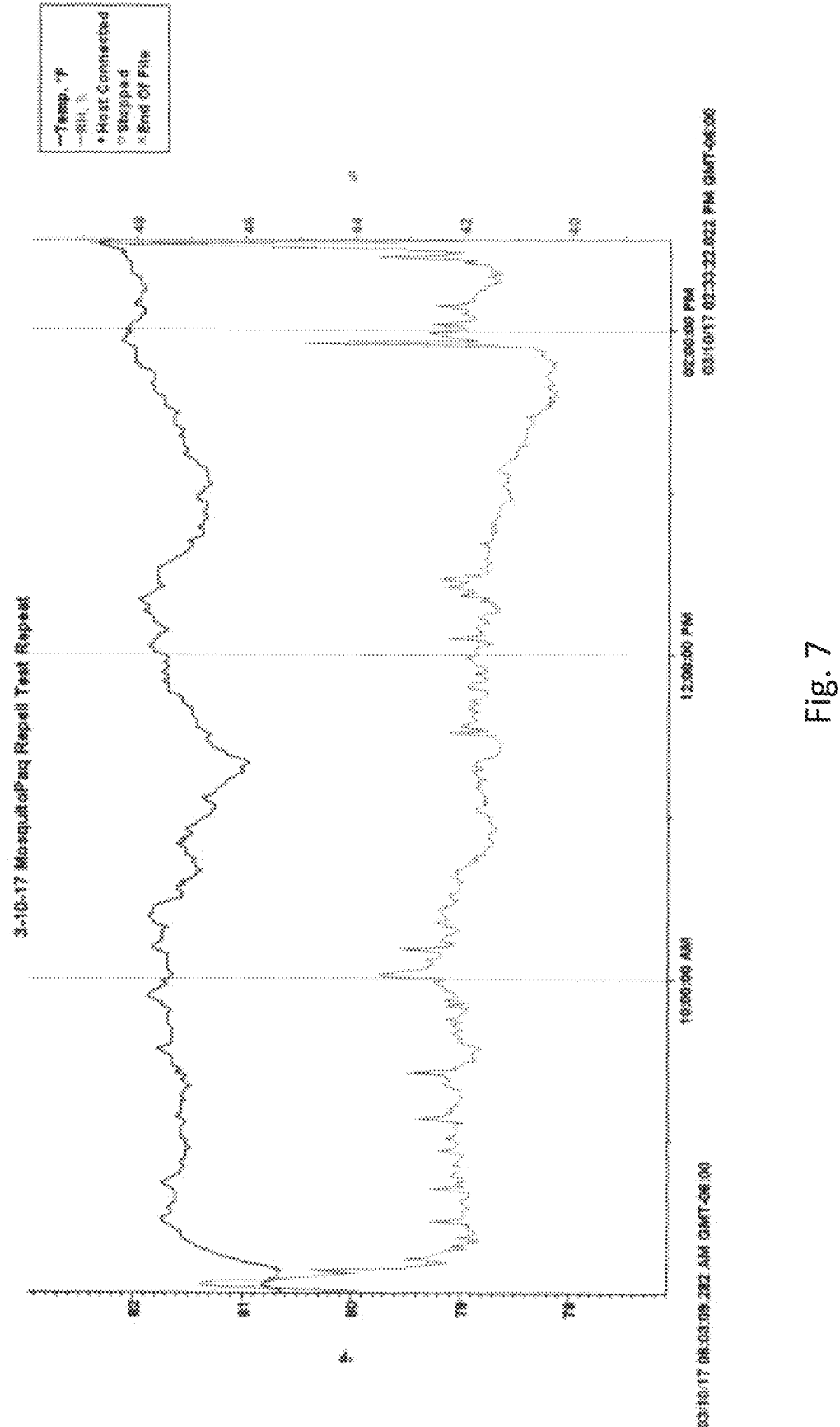
FIG. 7 is a graphical depiction of the temperature and humidity readings of example 4.

The deterrent effect of the above-described compositions of example 4 (represented as NO-Burn in FIGS. 8-9) was tested in a controlled environment. In vitro laboratory tests were conducted and measured and compared to DEET and nontreated control groups for yellow fever mosquitos, *Aedes aegypti*. The repellency of the formulations were compared to a DEET standard, and a non-treated control against yellow fever mosquitoes, *Aedes aegypti*. The examples were performed in a temperature-controlled laboratory following techniques as disclosed in Klun, J. A., M. A. Kramer, A. Zhang, S. Wang, and M. Debboun. 2008. A quantitative in vitro assay for mosquito deterrent activity without human blood cells. J Am. Mosq. Contr. Assoc. 24:508-512. Bioassays were conducted in nine, six-chambered Plexiglasss K&D modules interconnected with hoses to a water bath supplied with a temperature-controlled inversion circulator as displayed in (FIG. 5). Five colony-reared female *Aedes aegypti* were aspirated into each chamber (FIG. 1). Nine replications of the following treatments were randomly assigned to the chambers: No-Bite; No-Burn; Positive control—7% DEET standard (Off! Family Care Unscented) and Negative control—Non-treated. Repellents were applied to nine ca. 2"×2"×9" strips of organdy cloth and spread with a small paint brush over 12 cm' ink-pen-demarcated rectangles drawn on the strips with a flat plastic template. A micropipette set at 27.6 µl was used to apply liquid repellents, while creams were applied at 0.06 g (FIG. 6 *a-d*). Treated clothes were taped to flat plastic templates with openings aligning with lower Plexiglasss bases. The lower Plexiglasss bases contained shallow surface wells that were filled with a blood substitute (CDTA and ATP) and covered with moistened collagen membranes. The blood substitute was heated to 38° C. with water pumped through hose lines attached to the lower base and the water bath. The plastic templates were fitted between the K&D modules and lower Plexiglasss bases (FIG. 5). Mosquitoes were exposed to the treated surfaces by opening the K&D module sliding doors for 90-second biting counts at five post-treatment time intervals (0, 1, 2, 4 & 6 hrs) (FIG. 1). Fresh mosquitoes were aspirated into the chambers for each time interval. Ambient temperature and humidity were continuously recorded throughout the study with a HOBO data logger as displayed in FIG. 7. The dependent variable was biting count mean. Treatment and module means were independent variables. Biting counts as well as log and square root transformed biting counts by treatment were examined for normality with SAS PC Proc Univariate. The variance in biting count means by treatment and time intervals was statistically analyzed with SAS Proc ANOVA and statistically tested for significant differences with Tukey's Studentized Range test at p<0.05 and charted with 95% Confidence Intervals (C.I.). Average % repellency was calculated with the following formula and charted by treatment and time interval: (Control Avg. Biting Count−Treatment Avg. Biting Count)÷Control Avg. Biting Count×100.

Normality Tests:

Biting counts by treatment were found to follow closer to a normal distribution compared to log or square root transformed data. Consequently, all statistical analysis was conducted on non-transformed data.

Figure 8:
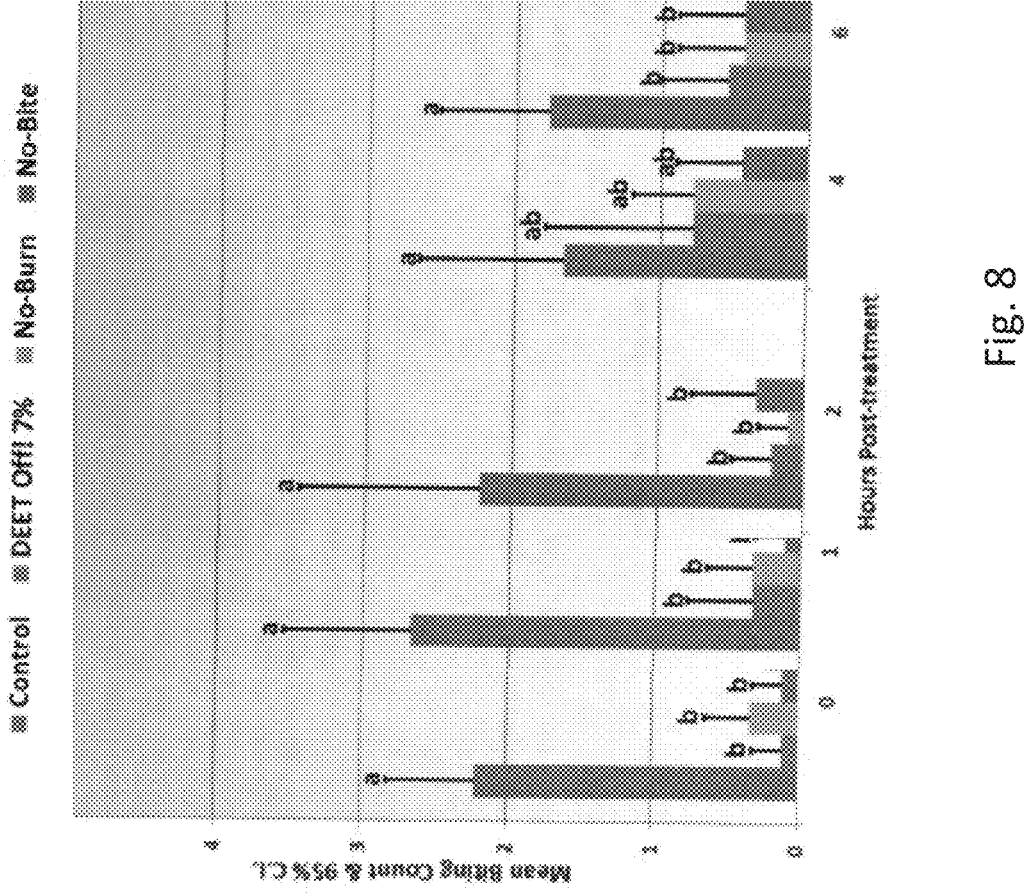
FIG. 8 is a graph of the mean bite count as a function of time for repellents of example 4.
Figure 9:
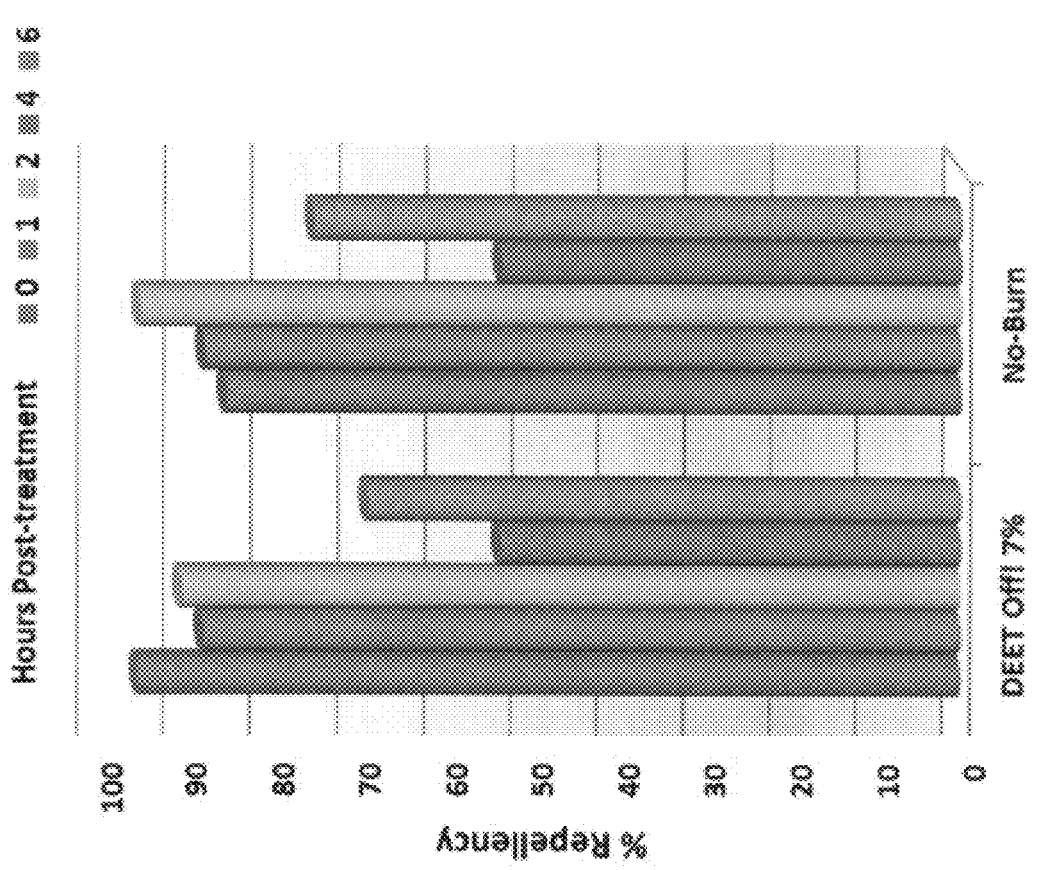
FIG. 9 is a graph of the % repellency as a function of time for repellents of example 4.

Biting Count and Repellency:

There was no significant difference (p>0.05) in average biting counts among the nine K&D modules. Biting counts in the controls were significantly (p<0.05) greater than all of the repellent treatments at 0, 1, 2, and 6 hours post-treatment (FIG. 8). At 4-hours, there was no significance difference (p>0.05) in biting activity among the control, DEET and no-burn/no-bite. There was no significant difference (p>0.05) in bites among the repellents at 4 hours. When biting count data were converted to percent repellency, all of the formulations appeared to perform as well, if not better, than the 7% DEET (FIG. 9).

The composition according to example 6 was tested in a similar manner as described above in Sarasota, Florida. The composition demonstrated similar efficacy for repelling insects as compared to 7% DEET, while demonstrating improvements with respect to preventing the oils from degrading in the lotion and extended shelf lift. Moreover, the composition of example 6 demonstrated improvements with respect to SPF protection through the provision of zeolite and the mix of zinc oxide size ranges. The lotion has an SPF of 30+.

Even though the present disclosure has been described in detail with reference to specific examples, it will be appreciated that the various modifications and changes can be made to these examples without departing from the scope of the present disclosure as set forth in the claims. It is anticipated and intended that future developments will occur in the technologies discussed herein, and that the disclosed article and/or assembly will be incorporated into such future developments. Thus, the specification and the drawings are to be regarded as an illustrative thought instead of merely restrictive thought.

It should be understood that references to mosquito is meant to encompass all insects, e.g., mosquito repellent encompasses protection from biting insects including ticks, flies, gnats, and sand fleas, to name a few.

It should be understood that references to a single element are not necessarily so limited and may include one or more of such element. Further, all numbers expressing dimensions, ratios and the like, used in the specification and claims, are to be understood to encompass tolerances and other deviations as represented by the term "about" or "approximately."

The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of "at least one of" is intended to be inclusive, analogous to the term and/or. As an example, the phrase "at least one of A, B and C" includes A only, B only, C only, or any combination thereof (e.g. AB, AC, BC or ABC). Additionally, use of adjectives such as first, second, etc. should be read to be interchangeable unless a claim recites an explicit limitation to the contrary.

What is claimed is:

1. A topical mosquito repellent and sunscreen composition comprising:

a lotion including active and inert ingredients, wherein the active ingredients include geraniol, clove oil, and rosemary oil and the inert ingredients include water, mineral oil, zinc oxide, beeswax, triethyl citrate, and lecithin; and wherein the zinc oxide comprises a mixture of different sized particles, wherein half of the zinc oxide particles have a size from 20-50 nm and half of the zinc oxide particles have a size of from 80-200 nm.

2. The topical mosquito repellent and sunscreen composition of claim 1 wherein the geraniol is present in an amount of from 4% to 5% by weight, the clove oil is present in an amount of from 1.5% to 2.5% by weight, the rosemary oil is present in an amount of 0.5% to 1.5% by weight, the water is present in an amount of from 20% by weight to 35% by weight, the mineral oil is present in an amount of from 25% to 45% by weight, the zinc oxide is present in an amount of from 6% to 20% by weight, the beeswax is present in an amount of from 3% to 10% by weight, the triethyl citrate is present in an amount of from 1% to 3% by weight, and the lecithin is present in an amount of from 0.5% to 1% by weight.

3. The topical mosquito repellent and sunscreen composition of claim 1, wherein the inert ingredients further include monolaurin present in an amount of from 1.5% to 4.5% by weight.

4. The topical mosquito repellent and sunscreen composition of claim 1, wherein the inert ingredients further include zeolite present in an amount of from 1% to 2% by weight.

5. The topical mosquito repellent and sunscreen composition of claim 4, wherein the zeolite has a particle size of 30-50 nm.

6. The topical mosquito repellent and sunscreen composition of claim 1, wherein the inert ingredients further include xanthan gum present in an amount of about 0.02% by weight.

7. The topical mosquito repellent and sunscreen composition of claim 1, wherein the composition has an SPF of 30 or greater.

8. The topical mosquito repellent and sunscreen composition of claim 1, wherein the lotion has a pH of 6 to 7.

9. A topical mosquito repellent and sunscreen lotion composition, comprising:

active ingredients including geraniol, clove oil, and rosemary oil; inert ingredients including water, mineral oil, zinc oxide, beeswax, monolaurin, triethyl citrate, zeolite, lecithin, and xanthan gum; and wherein the zeolite has a particle size of 30-50 nm.

10. The topical mosquito repellent and sunscreen lotion composition of claim 9, wherein the geraniol is present in an amount of from 4% to 5% by weight, the clove oil is present in an amount of from 1.5% to 2.5% by weight, and the rosemary oil is present in an amount of 0.5% to 1.5% by weight.

11. The topical mosquito repellent and sunscreen lotion composition of claim 9, wherein the water is present in an amount of from 25% to 30% by weight, the mineral oil is present in an amount of from 30% to 40% by weight, the zinc oxide is present in an amount of from 12% to 16% by weight, the beeswax is present in an amount of from 5% to 7% by weight, the monolaurin is present in an amount of from 2% to 4% by weight, the triethyl citrate is present in an amount of from 1.5% to 2.5% by weight, the zeolite is present in an amount of from 1% to 2% by weight, the lecithin is present in an amount of from 0.5% to 1% by weight, and the xanthan gum is present in an amount of from 0.01% to 0.03% by weight.

12. The topical mosquito repellent and sunscreen lotion composition of claim 9, wherein the zinc oxide comprises a mixture of different sized particles wherein half of the zinc oxide particles have a size from 20-50 nm and half of the zinc oxide particles have a size of from 80-200 nm.

13. The topical mosquito repellent and sunscreen lotion composition of claim 9, with a pH of between 6-7.

14. A method of repelling insects comprising:

applying a lotion composition to a body and exposing insects to the lotion, the lotion including active and inert ingredients, wherein the active ingredients include geraniol, clove oil, and rosemary oil and the inert ingredients include water, mineral oil, zinc oxide, beeswax, monolaurin, triethyl citrate, zeolite, lecithin, and xanthan gum; and wherein the zinc oxide comprises a mixture of different sized particles wherein half of the zinc oxide particles have a size from 20-50 nm and half of the zinc oxide particles have a size of from 80-200 nm.

15. The method of claim 14, wherein the geraniol is present in an amount of from 4% to 5% by weight, the clove oil is present in an amount of from 1.5% to 2.5% by weight, the rosemary oil is present in an amount of 0.5% to 1.5% by weight, the water is present in an amount of from 25% to 30% by weight, the mineral oil is present in an amount of from 30% to 40% by weight, the zinc oxide is present in an amount of from 12% to 16% by weight, the beeswax is present in an amount of from 5% to 7% by weight, the monolaurin is present in an amount of from 2% to 4% by weight, the triethyl citrate is present in an amount of from 1.5% to 2.5% by weight, the zeolite is present in an amount of from 1% to 2% by weight, the lecithin is present in an amount of from 0.5% to 1% by weight, and the xanthan gum is present in an amount of from 0.01% to 0.03% by weight.

16. The method of claim 14, wherein the lotion composition has an SPF of 30 or greater.

17. The method of claim 14, wherein the zeolite has a particle size of 30-50 nm.

* * * * *